(12) United States Patent
Curdt et al.

(10) Patent No.: US 7,760,977 B2
(45) Date of Patent: Jul. 20, 2010

(54) FIBER-OPTIC CABLE

(75) Inventors: Axel Curdt, Georgenborn (DE); Lothar Willmes, Hallgarten/Rheingau (DE); Wolfgang Eis, Niedernhausen/Oberhosbach (DE); Markus Kappel, Roxheim (DE); Thomas Weingärtner, Gau-Algesheim (DE); Thomas Henrich, Steinbach (DE); Wolfram Gehenn, Mainz (DE); Uwe Kolberg, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 12/210,352

(22) Filed: Sep. 15, 2008

(65) Prior Publication Data
US 2009/0067792 A1 Mar. 12, 2009

Related U.S. Application Data

(63) Continuation of application No. PCT/DE2007/000486, filed on Mar. 14, 2007.

(30) Foreign Application Priority Data
Mar. 14, 2006 (DE) .................. 10 2006 012 116

(51) Int. Cl.
*G02B 6/028* (2006.01)
*G02B 6/00* (2006.01)

(52) U.S. Cl. .................. 385/124; 385/123; 385/141; 385/142

(58) Field of Classification Search ......... 385/123–128, 385/141, 142; 65/385, 387
See application file for complete search history.

(56) References Cited

U.S. PATENT DOCUMENTS

| 3,607,322 | A | | 9/1971 | Brady et al. |
| 3,958,999 | A | * | 5/1976 | Izumitani et al. ............... 501/51 |
| 4,264,131 | A | | 4/1981 | Sawamura et al. |
| 4,573,762 | A | | 3/1986 | Joormann et al. |
| 6,235,667 | B1 | * | 5/2001 | Paloschi et al. ............... 501/72 |
| 6,806,216 | B2 | | 10/2004 | Mitra et al. |
| 7,072,562 | B2 | * | 7/2006 | Domres et al. ............... 385/142 |
| 7,095,941 | B2 | * | 8/2006 | Higby ........................ 385/142 |
| 7,169,470 | B2 | * | 1/2007 | Wolff et al. .................. 428/375 |
| 2003/0072554 | A1 | * | 4/2003 | Dohmen et al. ............. 385/142 |
| 2006/0082895 | A1 | * | 4/2006 | Inoue et al. .................. 359/652 |

FOREIGN PATENT DOCUMENTS

| DE | 199 58 522 A1 | 6/2001 |
| DE | 102 45 987 B3 | 5/2004 |
| EP | 1 405 834 A2 | 4/2004 |

OTHER PUBLICATIONS

International Search Report, dated Aug. 1, 2007.

* cited by examiner

*Primary Examiner*—Charlie Peng
(74) *Attorney, Agent, or Firm*—Laurence A. Greenberg; Werner H. Stemer; Ralph E. Locher

(57) ABSTRACT

Step-index optical waveguides are made of multicomponent glass containing a core glass and an outer glass which entirely surrounds the core class. A fiber-optic cable for conducting electromagnetic radiation, contains at least one bundle of individual fibers which encompass the step-index optical waveguides that are made of multicomponent glass containing a core glass and an outer glass that entirely surrounds the core glass on the circumferential wall thereof. These step-index optical waveguides provide great transmission capacity for transmitting data while keeping the transfer characteristics sufficiently durable. Furthermore, the fiber-optic cable is resistant against physical and chemical environmental influences and be protected against radical ambient chemicals. These aims are achieved by the fact that the outer glass of the step-index optical waveguides is provided with a material composition which is largely free from chemical interactions with the core glass when the fibers are drawn and is chemically inactive towards the plastic jacket.

61 Claims, No Drawings

FIBER-OPTIC CABLE

CROSS-REFERENCE TO RELATED APPLICATION

This is a continuation, under 35 U.S.C. §120, of copending international application No. PCT/DE2007/000486, filed Mar. 14, 2007, which designated the United States; this application also claims the priority, under 35 U.S.C. §119, of German patent application No. DE 10 2006 012 116.3, filed Mar. 14, 2006; the prior applications are herewith incorporated by reference in their entirety.

BACKGROUND OF THE INVENTION

Field of the Invention

The present invention relates to step-index optical fibers composed of multicomponent glass containing a lanthanum-containing or a lanthanum-free core glass and a cladding glass that completely encloses the core glass on its circumferential wall. Furthermore, the invention relates to a fiber-optic cable for conducting electromagnetic radiation, containing at least one bundle of individual fibers, wherein the individual fibers contain step-index optical fibers composed of multicomponent glass containing a core glass and a cladding glass that completely encloses the core glass on its circumferential wall.

For data transmission purposes, optical waveguides composed of plastic fibers are known in the prior art. These are used in so-called MOST bus systems. Plastic fibers have the disadvantage that their aging stability at the customary operating temperatures is low. Particularly if the optical waveguides are used in an environment having a high concentration of aggressive chemicals for a relatively long time, the surface but also the inner constitution of the plastic fibers is disadvantageously altered. This is accompanied by an undesirable deterioration in the optical properties, such that the increased requirements made of transmission properties for the data transmissions in plastic fibers are not ensured permanently.

Furthermore, the plastic fibers are subjected to an undesirable degradation by the climate of their environment. Cables composed of plastic fibers are usually used at application temperatures of −40° C. to +85° C. Particularly when used in motor vehicles or aircraft, this results in aging phenomena that are intensified by frequently changing temperatures at the site of use.

In some areas of a motor vehicle, a thermal stability of the cables of at least 125° C. in the interior or at least 150° C. in the engine compartment is required. Cables composed of plastic fibers have considerable disadvantages in these areas, with the result that a use is refrained from there.

Data cables composed of plastic which are embodied as single fiber cables additionally have large bending radii on account of the large fiber diameter. In the case where the minimum bending radius is undershot, light is coupled out and the data line is thus interrupted.

Fiber-optic cables having an extruded plastic cladding are furthermore known for illumination purposes. These cables have disadvantages with regard to chemical, thermal and mechanical stability required for ensuring a permanently optimum data transmission.

Step-index optical fibers composed of multicomponent glasses have proved to be suitable optical fibers, wherein step-index fibers contain a core glass and a cladding glass that completely encloses the core glass on its circumferential wall.

In general, an optical fiber for transmitting light is constructed from a core glass having a high refractive index and a cladding glass surrounding the core glass and having a lower refractive index than that of the core glass. A light-transmitting glass body in fiber form in which the refractive index is constant over the cross section of the core glass and which is enveloped with a cladding glass described is called a step-index fiber.

Optical fibers of this type transmit light which is coupled into one end of the fiber to the other end of the fiber, wherein the light is totally reflected (total reflection) at the interface between core glass and cladding glass.

The quantity of light that can be coupled into such a fiber and transmitted is proportional to the square of the numerical aperture (NA) of the fiber and the cross-sectional area of the fiber core. In order to transmit the largest possible quantities of light over short to medium distances (<100 m) such step-index fibers are packed together to form dense fiber bundles, provided with a protective sleeve, their ends are enclosed in metal casings or in casings of some other suitable material and the end sides are processed by grinding and polishing to form optically plane faces. Correspondingly preformed optical fiber bundles are called fiber-optic waveguides.

These fiber-optic waveguides find application in a wide variety of technical and medical areas (general industrial technology), illumination technology, traffic technology, automotive industry, architecture, endoscopy, dental medicine). Their most important function is transmission of a highest possible luminescence flux.

The higher the NA of the individual fibers contained in the bundle, the larger the quantities of light that can be transmitted by these fiber-optic waveguides. The quantity of light that is transmitted by fiber-optic waveguides depends not only on the NA of their fibers but also on the transmission property of the core glasses. Only core glasses having a very particular specific composition and having very low degrees of impurity of the raw materials from which they are melted conduct the light with the lowest possible attenuation over the entire length of the optical waveguides.

The raw materials for melting of such core glasses are extremely expensive on account of their high purity, which can lead to considerable production costs of such fibers or optical waveguides produced therefrom.

Step-index optical fibers composed of multicomponent glasses are produced either by the so-called double crucible method or the rod-tube method. In both cases, core glass and cladding glass are heated to temperatures which correspond to a viscosity range of between $10^4$ and $10^3$ dPa s and are drawn out to form a fiber in the process. In order that a stable fiber of low attenuation can be produced, core glass and cladding glass must be compatible with one another in a series of properties such as viscosity profile, thermal expansion, tendency toward crystallization, among many others. In particular, in the interface between fiber core and fiber cladding, contact reaction or crystallization must not occur: this would appreciably disturb a total reflection of the light guided in the fiber core and thus make the fiber unsuitable for application for low-attenuation light transmission. What is more, the mechanical strength of the fiber would also be adversely impaired by crystallization.

Optical glasses for step-index fibers are known from German patent DE 199 58 522 B4 2004.04.08, corresponding to U.S. Pat. No. 6,806,216 B2, and step-index fibers are known from German patent DE 102 45 987 B3, corresponding to U.S. Pat. No. 7,072,562 B2. German patent DE 199 58 522 B4 describes zinc-containing optical glasses having refractive indices $n_d$ of between 1.52 and 1.66. Alongside $SiO_2$, these glasses usually also contain ZnO in different percentages and principally alkalis and a few other elements such as B, Ba, Mg, Ca, Al, Y, Zr, Ge and in part Pb or the oxides thereof.

Most of the glasses disclosed therein are distinguished by a high internal transmission and good color neutrality. Alongside these optical properties, the glasses also have a good crystallization stability and meltability. Although the zinc-containing optical glasses tend toward crystallization to a greater extent than lead-containing glasses, glasses suitable for producing step-index fibers used according to the invention were able to be found from the glass system taken as a basis in German patent DE 199 58 522 B4.

Step-index fibers composed of the above-described glasses or optical fiber bundles composed of the step-index fibers have the property that they react sensitively to specific ambient chemicals. In particular, from the surface of the step-index fibers, constituents of chemical compounds are readily released from free radicals at the glass surface, such that the optical properties of the step-index fibers are no longer ensured.

These free radial ambient chemicals occur in motor vehicles, inter alia at or in which a multiplicity of different materials are processed which emit a large number of such free radicals to the environment. However, the materials which are used for sheathing bundles of such step-index fibers can also themselves liberate aggressive free radical elements or compounds which can pass directly to the surface of the step-index fibers.

SUMMARY OF THE INVENTION

It is an object of the invention to provide a fiber-optic cable which meets the requirements for use in motor vehicles. In this case, first it is of particular importance for the step-index fibers to have a high transmission capacity for the data transmission. Second, it is necessary for the transmission properties to be maintained sufficiently during the typical lifetime or total period of use of motor vehicles. In this case, the fiber-optic cable is intended to be resistant to physical and chemical ambient influences and to be protected against free radical ambient chemicals.

Other features which are considered as characteristic for the invention are set forth in the appended claims.

Although the invention is described herein as embodied in a fiber-optic cable, it is nevertheless not intended to be limited to the details described, since various modifications and structural changes may be made therein without departing from the spirit of the invention and within the scope and range of equivalents of the claims.

DETAILED DESCRIPTION OF THE INVENTION

The object is achieved according to the invention by virtue of the fact that the core glass of the step-index fibers has a material composition containing $SiO_2$ from 42 to 60% by weight, ZnO from 20 to 38% by weight, $Na_2O<14\%$ by weight, $K_2O<12\%$ by weight, $Na_2O+K_2O\geq2\%$ by weight, $La_2O_3$ from >0 to 10% by weight, BaO<0.9% by weight and, if appropriate, refining agents in the customary amounts, and the cladding glass of the step-index fibers has a material composition containing $SiO_2$ from 60-72% by weight, $B_2O_3<20\%$ by weight, $Al_2O_3<10\%$ by weight, $Na_2O<18\%$ by weight, $K_2O<15\%$ by weight, $Li_2O<5\%$ by weight, preferably <2% by weight, $F\leq1\%$ by weight, preferably <0.02% by weight and, if appropriate, refining agents in the customary amounts.

One preferred embodiment has $Li_2O<2\%$ by weight, $F\leq0.02\%$ by weight.

A fiber-optic cable is thus advantageously provided which ensures optimum optical properties and permanent stability of an optical fiber bundle. Particularly in the case of use in motor vehicles, the light guiding capability required for the data transmission is permanently maintained in this way. According to the invention, crystallization and interface reactions between cladding glass and core glass are already avoided by the choice of the glass composition during the production of the step-index fibers, during fiber pulling, whereby optimum optical properties of the individual fibers are achieved. Furthermore, interactions between cladding glass and plastic sheaths in the case of an optical fiber bundle, which could have an undesirable influence on the durability and thus also on the optical properties of the fiber-optic cable, are avoided by virtue of the cladding glass according to the invention. In particular this ensures the durability of the glass with respect to corrosion or erosion on account of exposure to ambient chemicals during use.

One advantageous variant of the step-index fiber has been found according to the invention in that the core glass of the step-index fibers has a material composition containing $SiO_2$ from 47 to 51% by weight, ZnO from 25 to 33% by weight, $Na_2O<10\%$ by weight, $K_2O<8\%$ by weight, $Na_2O+K_2O\geq2\%$ by weight, $La_2O_3$ from 3 to 5% by weight, BaO<0.9% by weight, and, if appropriate, refining agents in the customary amounts.

As an alternative, the invention proposes a step-index optical fibers composed of multicomponent glass containing lanthanum-free core glass and a cladding glass that completely encloses the core glass on its circumferential wall, wherein the core glass of the step-index fibers has a material composition containing $SiO_2$ from >53 to 60% by weight, ZnO from 20 to 38% by weight, $Na_2O<14\%$ by weight, $K_2O<12\%$ by weight, $Na_2O+K_2O\geq2\%$ by weight, BaO<0.9% by weight and, if appropriate, refining agents in the customary amounts, and the cladding glass of the step-index fibers has a material composition containing $SiO_2$ from 60-72% by weight, $B_2O_3<20\%$ by weight, $Al_2O_3<10\%$ by weight, $Na_2O<18\%$ by weight, $K_2O<15\%$ by weight, $Li_2O<5\%$ by weight, $F\leq1\%$ by weight and, if appropriate, refining agents in the customary amounts.

One preferred embodiment has $Li_2O<2\%$ by weight, F<0.02% by weight.

A step-index fiber for a fiber-optic cable is thus provided which has a better chemical resistance than the first-mentioned material composition. However, this material composition tends more toward crystallization during production by fiber pulling. Consequently, depending on the envisaged area of use, it is possible to select one of the two alternatives according to the invention for the production of the fiber-optic cable.

One advantageous variant of the step-index fiber has been found according to the invention in that the core glass of the step-index fibers has a material composition containing $SiO_2$ from 54 to 60% by weight, ZnO from 20 to 25% by weight, $Na_2O<14\%$ by weight, $K_2O<12\%$ by weight, $Na_2O+K_2O\geq2\%$ by weight, BaO<0.9% by weight and, if appropriate, refining agents in the customary amounts.

For the material compositions proposed according to the invention, it is furthermore advantageously provided that the core glass of the step-index fiber additionally contains $Li_2O<5\%$ by weight and/or $Al_2O_3<5\%$ by weight. Preferred embodiments have $Li_2O<1\%$ by weight and/or $Al_2O_3<2\%$ by weight.

Furthermore, for the material compositions proposed according to the invention, it is advantageously provided that the cladding glass of the step-index fibers has a material composition containing the components $SiO_2$ from 72-78% by weight, preferably 72.5-75% by weight, $B_2O_3$ from 5 to 15% by weight, preferably 8-12% by weight, $Al_2O_3$ from 5 to 10% by weight, $Na_2O$<10% by weight, preferably 5-10% by weight, $K_2O$<10% by weight, preferably 1-4% by weight, $Li_2O$<5% by weight, preferably <2% by weight, F≦1% by weight, preferably <0.02% by weight. In this case, one preferred variant of the step-index fiber has a material composition of $SiO_2$ from 72.5-75% by weight, $B_2O_3$ from 8-12% by weight, $Al_2O_3$ from 5 to 10% by weight, $Na_2O$ from 5-10% by weight, $K_2O$ 1-4% by weight, $Li_2O$<2% by weight, and F<0.02% by weight.

Furthermore it is advantageously provided according to the invention that the cladding glass of the step-index fibers has a material composition containing additional proportions of one or more of the following components: MgO<3% by weight, BaO<3% by weight, SrO<4% by weight, CaO<6% by weight, $TiO_2$<3% by weight, ZnO<3% by weight, $Rb_2O$<15% by weight, $Cs_2O$<15% by weight. In this case, a material composition has proved to be particularly advantageous which has a proportion of ZnO≦1.5% by weight, wherein a material composition having a proportion of ZnO of 0.6% by weight is provided in a first preferred variant and a material composition having a proportion of ZnO of 1% by weight is provided in a second preferred variant. Material compositions having a proportion of $TiO_2$<1% by weight are advantageously used. Since Rb and Cs are expensive raw materials, moreover, they are preferably used in the ranges $Rb_2O$<5% by weight and $Cs_2O$<5% by weight.

It is furthermore provided that the cladding glass of the step-index fibers has a material composition wherein the sum of the components $Li_2O$, $Na_2O$, $K_2O$, $Rb_2O$, $Cs_2O$>5% by weight.

In addition, it is provided according to the invention that the cladding glass of the step-index fibers has a material composition wherein the sum of the components MgO, CaO, SrO, BaO, ZnO≦4% by weight.

Furthermore, it has been found to be advantageous according to the invention for the cladding glass of the step-index fibers to have a material composition containing the components $SiO_2$ from 70-80% by weight, $B_2O_3$<5% by weight, $Al_2O_3$<10% by weight, $La_2O_3$<2% by weight, $Na_2O$<10% by weight, $K_2O$<10% by weight, $ZrO_2$<2% by weight.

An alternative embodiment is provided in that the cladding glass of the step-index fibers has a material composition contain additional proportions of one or more of the following components: MgO<10% by weight, BaO<2% by weight, CaO<2% by weight, ZnO<2% by weight. In this case, an embodiment variant containing ZnO≦1% by weight is preferred.

Owing to the better chemical resistance of the cladding glass according to the invention, the mechanical strength of the individual fibers is improved, such that a fiber-optic cable having a long service life can be made available with the step-index fiber thus produced.

With this material composition a fiber type is available which has a consistently good optical behavior particularly in moist heat, but primarily in a changing ambient climate. Consequently, the requirements made of data cables for example for use in motor vehicles are readily fulfilled.

The favorable properties with regard to the climate-relevant material alterations are achieved by virtue of the fact that the cladding glass of the individual fiber can be exposed to moisture without the moisture giving rise to erosion phenomena or "leaching" of the cladding glass. What is furthermore achieved is that the optical properties of the cladding glass relative to the core glass remain unimpaired, such that the properties with regard to the total reflection in the individual fiber are also maintained. Moreover, this prevents mechanical prestresses of the individual fibers from being reduced and the individual fibers from thus becoming brittle. It is thus possible to avoid fiber fracture, which would impair the transmission of light in the fiber-optic cable It has been recognized by the invention that specific material compositions of the cladding glass are unsuitable for specific plastic sheaths. On the other hand, during fiber pulling specific material compositions of the core glasses do not correspond to each material composition of the cladding glasses. These undesirable effects are overcome by core and cladding glass combinations provided according to the invention.

Moreover, the cladding glass can contain refining agents in the customary amounts. It is provided for this purpose that the cladding glass contains the refining agents $As_2O_3$, $Sb_2O_3$, $SnO_2$, RCl and/or $R_2SO_4$ in the customary amounts.

A material composition having a proportion of F<2% by weight has proved to be particularly advantageous, wherein a material composition having a proportion of F<0.5% by weight is provided in one preferred variant.

In order to ensure the properties of the individual fibers according to the invention, it is proposed to combine the cladding glass according to the invention with a core glass to the effect that the core glass of the step-index fibers has a material composition containing additional proportions of one or more of the following components: $ZrO_2$<2% by weight, MgO<6% by weight, CaO<5% by weight, SrO<6% by weight, $B_2O_3$<1% by weight.

Advantageous further combinations of the cladding glass according to the invention with a core glass is proposed to the effect that the core glass of the step-index fibers has a material composition containing additional proportions of one or more of the following components: $ZrO_2$<5% by weight, MgO<1% by weight, CaO<1% by weight.

It is provided according to the invention that the core glass a material composition with transmission capacity of the individual fiber produced therefrom having at least an attenuation of D(650 nm)≦300 dB/km, preferably D(650 nm)≦200 dB/km. In general, light or in general electromagnetic radiation of any desired wavelength can be used for the data transmission. Therefore the term "light" should generally be understood as electromagnetic radiation in the context of the present application.

The material composition for the core glass, as an individual fiber, thus has a sufficiently low attenuation depending on the purity of the raw materials used. This is ensured by the material composition according to the invention which has an attenuation of D(650 nm)≦300 dB/km, preferably D(650 nm)≦200 dB/km. The core glass can be produced in a favorable manner. During production, it is furthermore distinguished by a good pulling capability and it contains largely environmentally friendly raw material components. According to the invention it is provided that the core glass of individual material compositions from among the proposed material compositions with transmission capacity of the individual fiber produced therefrom has at least a numerical aperture NA≧0.48. The material composition for the core glass, as an individual fiber, thus has a sufficiently large numerical aperture. The acceptance angle—correlating with the numerical aperture NA—for fibers containing the core glasses according to the invention lies between 44° and approximately 58° for the material compositions specified in the table.

It has been found that the individual fibers produced with the material compositions according to the invention have improved overall mechanical strength and fewer weak points. Moreover, the individual fibers can be produced with lower costs.

The fiber-optic cable according to the invention can be used both as an optical waveguide for the entire application range of fiber-optic applications, for example as an optical waveguide in the area of illumination technology containing illumination applications of all types and also as a data cable, preferably in each case in building, industrial, power station, medical, vehicle, shipping, aircraft and space technology.

The invention furthermore relates to a fiber-optic cable for conducting electromagnetic radiation, containing at least one bundle of individual fibers which is accommodated in a plastic sheath, wherein the individual fibers are formed from step-index optical fibers as described above, and wherein the plastic sheath is impermeable and chemically resistant upon contact with ambient chemicals customary in domestic and motor vehicle environments, such as oils, fats, alkaline solutions, acids (in particular battery acid), brake fluid, PVC, fuels and liquids or gases that arise therefrom.

Consequently, high material stability of cladding glass and plastic sheath in the motor vehicle is ensured preferably in the case of data cables. Moreover, alongside low water vapor permeability, protection of the optical fibers against other ambient chemicals is also achieved. Consequently, a fiber-optic cable is provided which can readily be used in a corresponding environment, such as in power stations, vehicles, spacecraft, space probes, satellites, aircraft, ships, rail vehicles, trains and the like.

As mentioned above, it has been found by the invention that damaging substances, in particular including water vapor from the environment of the cable, that furthermore also specific substances from the cable sheath itself, can damage the cladding glass. It is therefore provided according to the invention that the plastic sheath is produced from a material which has a negligibly low inherent evaporation of plastic additives and/or residual monomer formation. This avoids a situation in which damaging effects on the surface of the cladding glass of the step-index fibers as a result of free radical chemical elements or compounds of the plastic sheath itself lead to an undesirable alteration of the fiber-optic cable. Alternative or optionally, it is also possible to use a plastic type which has exclusively a low inherent evaporation or residual monomer formation.

Combinations of cladding glass and plastics are provided according to the invention. The plastics constitute materials for the cable sheath which are suitable for the extrusion process. This is achieved in that the plastic sheath is a polymer material, having an elongation at break of greater than 10%, which has a strength of shore 60A to shore 80D.

It is proposed according to the invention for this purpose that the plastic sheath includes a material containing one or more of the following plastics:

fluoropolymers preferably PVDF, FEP, ETFE; thermoplastic elastomers based on olefins, crosslinked olefins and/or rubbers; thermoplastics, preferably PVC, PE, PP, PA, PBT; copolyesters; urethanes; polyesters; polyamides and/or polyetheramides. These materials can be used by themselves either as blends or in a filled manner. According to the invention, the cable sheath is provided either as a monolayer construction or a multilayer construction.

According to the invention, a combination of cladding glass and plastic composition is provided by virtue of the fact that the plastic sheath is a thermoplastic polyurethane elastomer or a crosslinked thermoplastic elastomer, preferably polyvinylidene fluoride (PVDF), a thermoplastic urethane (TPE-U), a polypropylene copolymer (TPE-0) or a polyolefin rubber compound (TPE-V).

What is achieved with the plastics found is that the plastic sheath and the cladding glass are chemically inactive with respect to one another. The plastic sheath has a high long-term temperature stability, for instance in the region of +125° C. over 6,000 hours, a high thermal cycling stability of approximately −40° C. to +125° C. over 3,000 hours and a high resistance to moist heat at +85° C. and 85% relative humidity over 3,000 hours.

Furthermore, the plastic sheath has the prescribed flame retardancy, chemical resistants to the typical ambient chemicals in a motor vehicle and optimum small bending radii to approximately 5 mm without a significant increase in the optimal attenuation of the core glass.

Furthermore, the plastics, residual monomer proportions and additives such as flame retardants, for example, according to the invention separate off no or only sufficiently small quantities of acidic or alkaline components, which may be the case in particular with high air humidity and in combination with high temperatures in the case of customary plastics in motor vehicle construction.

A further improvement of the required resistance of the fiber-optic cable is provided according to the invention by virtue of the fact that the optical fiber bundle in the plastic sheath is wetted with a hydrophobic sizing agent. A protective film is thus established between the plastic sheath and the cladding glass surface, and prevents the glass surface from being exposed to water vapor or water-dissolved free radicals.

According to the invention it is proposed here that the sizing agent has one or more of the following constituents: carboxylic acids containing n carbon atoms ($C_n$; $n>12$), so-called long-chain carboxylic acids; ethoxylated fatty acid amino amides; modified organosilanes; fluoroalkyl-functional silanes; perfluoropolyethers; condensates of polyethylenimines and salts thereof; silicone oil. The sizing agents found are largely chemically neutral and have optimum sliding and wetting properties. Furthermore, they are extremely water-repellant or water-vapor-repellant (hydrophobic).

The fiber-optic cable according to the invention advantageously provides a data cable which has a sufficiently good light guiding capability and, in particular, has a low attenuation required for an optimum data transmission and is suitable for use in environments with aggressive substances. In this case lead-containing and/or zinc-containing core glasses in combination with corresponding material compositions for cladding glasses have been found, for example according to the disclosure in the documents introduced at the beginning.

In one preferred embodiment of the invention, step-index optical fibers used are individual fibers in a combination such that the core glass contains a material composition containing the components $SiO_2$ from 42 to 53% by weight, ZnO from 16 to 38% by weight, PbO from 1 to 20% by weight, wherein the sum of ZnO and PbO is $\geq 30\%$ by weight, $Na_2O<14\%$ by weight, $K_2O<12\%$ by weight, wherein the sum of $Na_2O$ and $K_2O \geq 2\%$ by weight, and a cladding glass which contains a material composition containing the components $SiO_2$ from 60 to 72% by weight, $B_2O_3<20\%$ by weight, $Al_2O_3<10\%$ by weight, $Na_2O<18\%$ by weight, $K_2O<15\%$ by weight, and $ZnO<1.5\%$ by weight. The cladding glass can contain refining agents.

A further preferred embodiment of the fiber-optic cable for use in land vehicles, aircraft or spacecraft is achieved with a step-index fiber that is free of lead-containing components. This is provided by a combination of core glass and cladding glass as follows, wherein the core glass contains a material composition containing the components $SiO_2$ from 42 to 53% by weight, ZnO from 30 to 38% by weight, BaO<0.9% by weight, $Na_2O$<14% by weight, $K_2O$<12% by weight, wherein the sum of $Na_2O$ and $K_2O \geqq 2\%$ by weight and a cladding glass containing a composition $SiO_2$ from 60 to 72% by weight, $B_2O_3$<20% by weight, $Al_2O_3$<10% by weight, $Na_2O$<18% by weight, $K_2O$<15% by weight, and ZnO<1.5% by weight. The cladding glass can likewise contain refining agents.

A further embodiment of the fiber-optic cable according to the invention is provided by virtue of the fact that the cladding glass of the step-index fibers has a material composition containing the components $SiO_2$ from 70-80% by weight, $B_2O_3$<5% by weight, $Al_2O_3$<10% by weight, $La_2O_3$<2% by weight, $Na_2O$<10% by weight, $K_2O$<10% by weight, $ZrO_2$<2% by weight.

In this case, it is additionally provided according to the invention that the cladding glass of the step-index fibers has a material composition containing additional proportions of one or more of the following components: MgO<10% by weight, BaO<2% by weight, CaO<2% by weight, ZnO<2% by weight, preferably $ZnO \leqq 1\%$ by weight.

The step-index fibers found have a high chemical resistance of cladding glass and core glass during the fiber pulling process, such that crystallization and interface reactions are avoided. The core glass has a high transmission capacity with optimum reflection capacity at the boundary between core glass and cladding glass and attenuation is low. Furthermore, the cladding glass advantageously corresponds to the plastic sheaths found. The fiber-optic data cable according to the invention has, by comparison with plastic fibers, thermal stabilities lying in the range of from at least 125° C. up to 150° C.

The invention furthermore encompasses individual fibers containing further material compositions which, during the fiber pulling of the individual fibers, have little tendency toward crystallization at the interfaces between core glass and cladding glass, wherein the plastic sheath corresponds to the cladding glass in the manner according to the invention.

The invention furthermore provides an embodiment of a fiber-optic cable in an advantageous manner by virtue of the fact that the bundle of individual fibers is hot melt bonded or adhesively bonded at the ends and/or is provided with crimped end terminations. It is provided in this case that combinations of the aforementioned end terminations or end faces are also realized on a fiber-optic cable. In this case, it is additionally provided according to the invention that the end faces have an optically active region having a diameter of 0.3 to 2.0 mm, preferably 1.0 mm. It is furthermore provided that the individual fibers have a diameter of 30 to 150 µm, preferably a diameter of 53 µm with a deviation tolerance of 4 µm. It is furthermore provided that the cable diameter is overall between 1 and 5 mm, preferably 2.3 mm. A fiber-optic cable is thus provided which can be laid in a flexible manner since it realizes small bending radii. In motor vehicle construction, in particular, the fiber-optic cable having minimum bending radii of approximately 5 mm can be installed in a simple manner. The fiber-optic cable can be produced with a number of individual fibers of between 50 and 2000 individual fibers without the advantageous properties of the data cable being impaired, and the bundle has sufficient mechanical strength. For this purpose the bundle of individual fibers is accommodated in a plastic sheath composed of one of the plastics proposed, preferably TPE-V.

Further embodiments of the fiber-optic cable according to the invention can be gathered from table 1 below for the material compositions of cladding glasses and table 2 for the material compositions of core glasses. In this case, the corresponding core and cladding glasses can be combined freely.

The fiber-optic cables according to the invention are preferably used for illumination applications or data transmission applications in particular in each case in building or industrial or power station or medical or vehicle or shipping or aircraft or space technology. They can particularly preferably be used for data transmission in automobiles or motorcycles.

Table 3 specifies combinations according to the invention for core and cladding glasses on the basis of values determined for the attenuation. The specified embodiments of the glasses and also the combinations in accordance with table 3 are by way of example and do not in any way represent an exhaustive enumeration. Further advantageous embodiments of the glasses and the combinations thereof are likewise encompassed by the invention.

Combinations of core glass 5 and cladding glass 4 and of core glass 6 and cladding glass 3 have proved to be a particularly advantageous solution according to the invention.

TABLE 1

| | Cladding glasses | | | |
|---|---|---|---|---|
| Component | Cladding glass 1 [% by weight] | Cladding glass 2 [% by weight] | Cladding glass 3 [% by weight] | Cladding glass 4 [% by weight] |
| $SiO_2$ | 67.9 | 68.5 | 73.9 | 69.9 |
| $B_2O_3$ | 18.5 | 19.0 | 9.6 | 1.0 |
| $Li_2O$ | 0.5 | 0.7 | — | — |
| $Na_2O$ | 6.9 | 0.7 | 6.6 | 12.6 |
| $K_2O$ | — | 7.6 | 2.5 | 3.2 |
| MgO | — | — | — | 2.7 |
| CaO | — | — | 0.6 | 5.1 |
| BaO | — | — | — | 2.1 |
| $TiO_2$ | — | — | — | 0.1 |
| $Al_2O_2$ | 5.6 | 2.7 | 6.6 | 4.0 |
| ZnO | 1.0 | 0.6 | — | — |

TABLE 2

| | Core glasses | | | | | |
|---|---|---|---|---|---|---|
| Component | Core glass 1 [% by weight] | Core glass 2 [% by weight] | Core glass 3 [% by weight] | Core glass 4 [% by weight] | Core glass 5 [% by weight] | Core glass 6 [% by weight] |
| $SiO_2$ | 47.7 | 44.5 | 46.4 | 47.7 | 50.7 | 57.9 |
| $La_2O_3$ | 4.2 | — | — | — | 4.7 | — |
| $Li_2O$ | 0.9 | — | 1.1 | 0.9 | 1.0 | — |
| $Na_2O$ | 7.7 | 8.0 | 8.3 | 8.3 | 8.9 | 9.7 |
| $K_2O$ | 6.2 | 8.9 | 5.8 | 5.8 | 7.6 | 8.0 |
| BaO | 0.8 | — | 0.8 | 0.8 | 0.9 | 0.8 |
| $ZrO_2$ | — | — | — | 1.8 | — | — |
| ZnO | 32.2 | 34.8 | 37.3 | 34.4 | 25.9 | 21.9 |
| $Al_2O_3$ | | | | | | 1.5 |
| PbO | — | 3.5 | — | — | — | — |

TABLE 3

| | | Attenuation | | | | |
|---|---|---|---|---|---|---|
| | | Core glass according to table 2 | | | | |
| | | No 5 | No 1 | No. 6 | No 6 | No. 1 |
| | | Cladding glass according to table 1 | | | | |
| | | No. 4 | No. 1 | No. 3 | No. 2 | No. 2 |
| Fiber attenuation in dB/km measured according to DIN 58141 part 1 | 400 nm | 219 | 281 | 144 | 197 | 251 |
| | 450 nm | 245 | 265 | 225 | 255 | 240 |
| | 550 nm | 130 | 145 | 140 | 162 | 117 |
| | 650 nm | 175 | 155 | 171 | 194 | 130 |
| | 850 nm | 208 | 126 | 126 | 148 | 108 |

The invention claimed is:

1. A step-index optical fiber composed of multicomponent glass, comprising:
   a lanthanum-containing core glass having a circumferential wall; and
   a cladding glass completely enclosing said lanthanum-containing core glass on said circumferential wall;
   said lanthanum-containing core glass having a material composition, containing:

| | |
|---|---|
| $SiO_2$ | from 42 to 60% by weight; |
| ZnO | from 20 to 38% by weight; |
| $Na_2O$ | <14% by weight; |
| $K_2O$ | <12% by weight; |
| $Na_2O + K_2O$ | ≧2% by weight; |
| $La_2O_3$ | from >0 to 10% by weight; and |
| BaO | ≦0.9% by weight; | said cladding glass having a material composition, containing:

| | |
|---|---|
| $SiO_2$ | from 60-72% by weight; |
| $B_2O_3$ | <20% by weight; |
| $Al_2O_3$ | <10% by weight; |
| $Na_2O$ | <18% by weight; |
| $K_2O$ | <15% by weight; |
| $Li_2O$ | <5% by weight; and |
| F | ≦1% by weight. |

2. The step-index optical fiber according to claim 1, wherein said material composition of said lanthanum-containing core glass further comprises:

| | |
|---|---|
| $SiO_2$ | from 47 to 51% by weight; |
| ZnO | from 25 to 33% by weight; |
| $Na_2O$ | <10% by weight; |
| $K_2O$ | <8% by weight; |
| $Na_2O + K_2O$ | ≧2% by weight; |
| $La_2O_3$ | from 3 to 5% by weight; |
| BaO | <0.9% by weight; and |
| refining agents in customary amounts. | |

3. The step-index optical fiber according to claim 1, wherein said lanthanum-containing core glass further comprises at least one of $Li_2O$ <5% by weight and $Al_2O_3$ <5% by weight.

4. The step-index optical fiber according to claim 1, wherein said material composition of said cladding glass further comprises:

| | |
|---|---|
| $SiO_2$ | from 72-78% by weight; |
| $B_2O_3$ | from 5 to 15% by weight; |
| $Al_2O_3$ | from 5 to 10% by weight; |
| $Na_2O$ | <10% by weight; |
| $K_2O$ | <10% by weight; |
| $Li_2O$ | <5% by weight; |
| F | ≦1% by weight. |

5. The step-index optical fiber according to claim 1, wherein said material composition of said cladding glass contains at least one of the following components:

| | |
|---|---|
| MgO | <3% by weight; |
| BaO | <3% by weight; |
| SrO | <4% by weight; |
| CaO | <6% by weight; |
| $TiO_2$ | <3% by weight; |
| ZnO | <3% by weight; |
| $Rb_2O$ | <15% by weight; and |
| $Cs_2O$ | <15% by weight. |

6. The step-index optical fiber according to claim 5, wherein in said cladding glass a sum of components $Li_2O$, $Na_2O$, $K_2O$, $Rb_2O$, $Cs_2O$ is >5% by weight.

7. The step-index optical fiber according to claim 5, wherein in said cladding glass a sum of components MgO, CaO, SrO, BaO, ZnO is ≦4% by weight.

8. The step-index optical fiber according to claim 1, wherein said material composition of said cladding glass further comprises:

| | |
|---|---|
| $SiO_2$ | from 70-80% by weight; |
| $B_2O_3$ | <5% by weight; |
| $Al_2O_3$ | <10% by weight; |
| $La_2O_3$ | <2% by weight; |
| $Na_2O$ | <10% by weight; |
| $K_2O$ | <10% by weight; and |
| $ZrO_2$ | <2% by weight. |

9. The step-index optical fiber according to claim 8, wherein said material composition of said cladding glass further comprises at least one of the following components:

| | |
|---|---|
| MgO | <10% by weight; |
| BaO | <2% by weight; |
| CaO | <2% by weight; and |
| ZnO | <2% by weight. |

10. The step-index optical fiber according to claim 1, wherein at least one of said lanthanum-containing core glass and said cladding glass further has at least one refining agent selected from the group consisting of $As_2O_3$, $Sb_2O_3$, $SnO_2$, RCl and $R_2SO_4$.

11. The step-index optical fiber according to claim 1, wherein said material composition of said lanthanum-containing core glass further has a proportion of F <2% by weight.

12. The step-index optical fiber according to claim 1, wherein said material composition of said lanthanum-containing core glass further contains at least one of:

| | |
|---|---|
| $ZrO_2$ | <2% by weight; |
| MgO | <6% by weight; |
| CaO | <5% by weight; |
| SrO | <6% by weight; and |
| $B_2O_3$ | <1% by weight. |

13. The step-index optical fiber according to claim 1, wherein said material composition of said lanthanum-containing core glass further comprises at least one of:

| | |
|---|---|
| $ZrO_2$ | <5% by weight; |
| MgO | <1% by weigh; and |
| CaO | <1% by weight. |

14. The step-index optical fiber according to claim 1, wherein said material composition of said lanthanum-containing core glass has an attenuation of D(650nm) $\leqq$300 dB/km.

15. The step-index optical fiber according to claim 1, wherein:
said lanthanum-containing core glass has refining agents in customary amounts;
said cladding glass has refining agents in customary amounts;
said material composition of said cladding glass, contains:
$Li_2O$ <2% by weight; and
F<0.02% by weight.

16. The step-index optical fiber according to claim 1, wherein said lanthanum-containing core glass further comprises at least one of $Li_2O$ <1% by weight and $Al_2O_3$ <2% by weight.

17. The step-index optical fiber according to claim 1, wherein said material composition of said cladding glass further comprises:

| | |
|---|---|
| $SiO_2$ | from 72.5-75% by weight; |
| $B_2O_3$ | 8-12% by weight; |
| $Al_2O_3$ | from 5 to 10% by weight; |
| $Na_2O$ | 5-10% by weight; |
| $K_2O$ | 1-4% by weight; |
| $Li_2O$ | <2% by weight; and |
| F | <0.02% by weight. |

18. The step-index optical fiber according to claim 5, wherein said material composition of said cladding glass contains at least one of the following components:

| | |
|---|---|
| $TiO_2$ | <1% by weight; |
| ZnO | $\leqq$1.5% by weight; |
| $Rb_2O$ | $\leqq$5% by weight; and |
| $Cs_2O$ | $\leqq$5% by weight. |

19. The step-index optical fiber according to claim 8, wherein said material composition of said cladding glass comprises ZnO $\leqq$1% by weight.

20. The step-index optical fiber according to claim 11, wherein said material composition of said lanthanum-containing core glass further contains a proportion of F <0.5% by weight.

21. The step-index optical fiber according to claim 1, wherein said material composition of said lanthanum-containing core glass has an attenuation of D(650nm) $\leqq$200 dB/km.

22. A step-index optical fiber composed of multicomponent glass, comprising:
a lanthanum-free core glass having a circumferential wall; and
a cladding glass completely enclosing said lanthanum-free core glass on said circumferential wall;
said lanthanum-free core glass having a material composition, containing:

| | |
|---|---|
| $SiO_2$ | from >53 to 60% by weight; |
| ZnO | from 20 to 38% by weight; |
| $Na_2O$ | <14% by weight; |
| $K_2O$ | <12% by weight; |
| $Na_2O + K_2O$ | $\geqq$2% by weight; and |
| BaO | <0.9% by weight; | said cladding glass having a material composition, containing:

| | |
|---|---|
| $SiO_2$ | from 60-72% by weight; |
| $B_2O_3$ | <20% by weight; |
| $Al_2O_3$ | <10% by weight; |
| $Na_2O$ | <18% by weight; |
| $K_2O$ | <15% by weight; |
| $Li_2O$ | <5% by weight; and |
| F | $\leqq$1% by weight. |

23. The step-index optical fiber according to claim 22, wherein said material composition of said lanthanum-free core glass, further comprises:

| | |
|---|---|
| $SiO_2$ | from 54 to 60% by weight; |
| ZnO | from 20 to 25% by weight; |
| $Na_2O$ | <14% by weight; |
| $K_2O$ | <12% by weight; |
| $Na_2O + K_2O$ | $\geqq$2% by weight; and |
| BaO | <0.9% by weight. |

24. The step-index optical fiber according to claim 22, wherein said lanthanum-free core glass further has at least one of $Li_2O$ <5% by weight and $Al_2O_3$ <5% by weight.

25. The step-index optical fiber according to claim 22, wherein said material composition of said cladding glass further comprises:

| | |
|---|---|
| $SiO_2$ | from 72-78% by weight; |
| $B_2O_3$ | from 5 to 15% by weight; |
| $Al_2O_3$ | from 5 to 10% by weight; |
| $Na_2O$ | <10% by weight; |
| $K_2O$ | <10% by weight; |
| $Li_2O$ | <5% by weight; and |
| F | $\leqq$1% by weight. |

26. The step-index optical fiber according to claim 22, wherein said material composition of said cladding glass contains at least one of the following components:

| | |
|---|---|
| MgO | <3% by weight; |
| BaO | <3% by weight; |
| SrO | <4% by weight; |
| CaO | <6% by weight; |
| $TiO_2$ | <3% by weight; |
| ZnO | <3% by weight; |
| $Rb_2O$ | <15% by weight; and |
| $Cs_2O$ | <15% by weight. |

27. The step-index optical fiber according to claim 26, wherein in said cladding glass a sum of components $Li_2O$, $Na_2O$, $K_2O$, $Rb_2O$, $Cs_2O$ is >5% by weight.

28. The step-index optical fiber according to claim 26, wherein in said cladding glass a sum of components MgO, CaO, SrO, BaO, ZnO is ≦4% by weight.

29. The step-index optical fiber according to claim 22, wherein said material composition of said cladding glass further comprises:

| | |
|---|---|
| $SiO_2$ | from 70-80% by weight; |
| $B_2O_3$ | <5% by weight; |
| $Al_2O_3$ | <10% by weight; |
| $La_2O_3$ | <2% by weight; |
| $Na_2O$ | <10% by weight; |
| $K_2O$ | <10% by weight; and |
| $ZrO_2$ | <2% by weight. |

30. The step-index optical fiber according to claim 29, wherein said material composition of said cladding glass further comprises at least one of the following components:

| | |
|---|---|
| MgO | <10% by weight, |
| BaO | <2% by weight, |
| CaO | <2% by weight, and |
| ZnO | <2% by weight. |

31. The step-index optical fiber according to claim 22, wherein at least one of said lanthanum-free core glass and said cladding glass further contains at least one refining agent selected from the group consisting of $As_2O_3$, $Sb_2O_3$, $SnO_2$, RCl and $R_2SO_4$.

32. The step-index optical fiber according to claim 22, wherein said material composition of said lanthanum-free core glass further contains a proportion of F <2% by weight.

33. The step-index optical fiber according to claim 22, wherein said material composition of said lanthanum-free core glass further contains at least one of:

| | |
|---|---|
| $ZrO_2$ | <2% by weight; |
| MgO | <6% by weight; |
| CaO | <5% by weight; |
| SrO | <6% by weight; and |
| $B_2O_3$ | <1% by weight. |

34. The step-index optical fiber according to claim 22, wherein said material composition of said lanthanum-free core glass further comprises at least one of:

| | |
|---|---|
| $ZrO_2$ | <5% by weight; |
| MgO | <1% by weigh; and |
| CaO | <1% by weight. |

35. The step-index optical fiber according to claim 22, wherein said material composition of said lanthanum-free core glass has an attenuation of D(650nm) ≦300 dB/km.

36. The step-index optical fiber according to claim 22, wherein:
said lanthanum-free core glass has refining agents in customary amounts;
said cladding glass further has refining agents in customary amounts;
said material composition of said cladding glass, containing:
$Li_2O$ <2% by weight; and
F <0.02% by weight.

37. The step-index optical fiber according to claim 22, wherein said lanthanum-free core glass further comprises at least one of $Li_2O$ <1% by weight and $Al_2O_3$ <2% by weight.

38. The step-index optical fiber according to claim 22, wherein said material composition of said cladding glass further comprises:

| | |
|---|---|
| $SiO_2$ | from 72.5-75% by weight; |
| $B_2O_3$ | 8-12% by weight; |
| $Al_2O_3$ | from 5 to 10% by weight; |
| $Na_2O$ | 5-10% by weight; |
| $K_2O$ | 1-4% by weight; |
| $Li_2O$ | <2% by weight; and |
| F | <0.02% by weight. |

39. The step-index optical fiber according to claim 26, wherein said material composition of said cladding glass contains at least one of the following components:

| | |
|---|---|
| $TiO_2$ | <1% by weight; |
| ZnO | ≦1.5% by weight; |
| $Rb_2O$ | ≦5% by weight; and |
| $Cs_2O$ | ≦5% by weight. |

40. The step-index optical fiber according to claim 29, wherein said material composition of said cladding glass contains ZnO ≦1% by weight.

41. The step-index optical fiber according to claim 32, wherein said material composition of said lanthanum-free core glass further contains a proportion of F <0.5% by weight.

42. The step-index optical fiber according to claim 22, wherein said material composition of said lanthanum-free core glass has an attenuation of D(650nm) ≦200 dB/km.

43. A fiber-optic cable for conducting electromagnetic radiation, comprising:
a plastic sheath being impermeable and chemically resistant upon contact with ambient chemicals customary in domestic and motor vehicle environments, including oils, fats, alkaline solutions, acids, battery acids, brake fluid, PVC, fuels, liquids and gases that arise therefrom; and
at least one bundle of individual fibers accommodated in said plastic sheath, said individual fibers formed as step-index optical fibers, containing:

a lanthanum-containing core glass having a circumferential wall; and
a cladding glass completely enclosing said lanthanum-containing core glass on said circumferential wall;
said lanthanum-containing core glass having a material composition, containing:

| | |
|---|---|
| $SiO_2$ | from 42 to 60% by weight; |
| ZnO | from 20 to 38% by weight; |
| $Na_2O$ | <14% by weight; |
| $K_2O$ | <12% by weight; |
| $Na_2O + K_2O$ | $\geq$2% by weight; |
| $La_2O_3$ | from >0 to 10% by weight; and |
| BaO | $\leq$0.9% by weight; | said cladding glass having a material composition, containing:

| | |
|---|---|
| $SiO_2$ | from 60-72% by weight; |
| $B_2O_3$ | <20% by weight; |
| $Al_2O_3$ | <10% by weight; |
| $Na_2O$ | <18% by weight; |
| $K_2O$ | <15% by weight; |
| $Li_2O$ | <5% by weight; and |
| F | $\leq$1% by weight; | said plastic sheath produced from a material having at least one of a negligibly low inherent evaporation of plastic additives and a residual monomer formation;
said plastic sheath being a polymer material, having an elongation at break of greater than 10%, which has a strength of shore 60A to shore 80D;
said plastic sheath containing a material formed of at least one of:
fluoropolymers;
thermoplastic elastomers based on at least one of olefins, crosslinked olefins and rubbers;
thermoplastics; and
at least one of copolyesters, urethanes, polyesters, polyamides and polyetheramides; and
said plastic sheath is one of a thermoplastic polyurethane elastomer and a crosslinked thermoplastic elastomer.

44. The fiber-optic cable according to claim 43, wherein said optical fiber bundle in said plastic sheath is wetted with a hydrophobic sizing agent.

45. The fiber-optic cable according to claim 43, wherein said sizing agent has at least one of:
carboxylic acids containing n carbon atoms ($C_n$; n>12);
ethoxylated fatty acid amino amides;
modified organosilanes;
fluoroalkyl-functional silanes;
perfluoropolyethers;
condensates of polyethylenimines and salts thereof; and
silicone oil.

46. The fiber-optic cable according to claim 43, wherein:
said bundle of individual fibers is at least one of hot melt bonded and adhesively bonded at ends and provided with crimped end terminations;
said individual fibers have end faces with an optically active region having a diameter of 0.3 to 2.0 mm;
said individual fibers have a diameter of 30 to 150 µm; and
the fiber-optic cable has an overall cable diameter of between 1 and 5 mm.

47. The fiber-optic cable according to claim 43, wherein:
said fluoropolymers are selected from the group consisting of PVDF, FEP, and ETFE; and
said thermoplastics are selected from the group consisting of PVC, PE, PP, PA, and PBT.

48. The fiber-optic cable according to claim 43, wherein said thermoplastic polyurethane elastomer and said crosslinked thermoplastic elastomer are selected from the group consisting of a polyvinylidene fluoride (PVDF), a thermoplastic urethane (TPE-U), a polypropylene copolymer (TPE-0) and a polyolefin rubber compound (TPE-V).

49. The fiber-optic cable according to claim 46, wherein said diameter is 1.0 mm.

50. The fiber-optic cable according to claim 46, wherein said diameter is 53 µm with a deviation tolerance of 4 µm.

51. The fiber-optic cable according to claim 46, wherein said overall cable diameter is 2.3 mm.

52. A fiber-optic cable for conducting electromagnetic radiation, comprising:
a plastic sheath being impermeable and chemically resistant upon contact with ambient chemicals customary in domestic and motor vehicle environments, including oils, fats, alkaline solutions, acids, battery acids, brake fluid, PVC, fuels, liquids and gases that arise therefrom; and
at least one bundle of individual fibers accommodated in said plastic sheath, said individual fibers formed as step-index optical fibers, containing:
a lanthanum-free core glass having a circumferential wall; and
a cladding glass completely enclosing said lanthanum-free core glass on said circumferential wall;
said lanthanum-free core glass having a material composition, containing:

| | |
|---|---|
| $SiO_2$ | from >53 to 60% by weight; |
| ZnO | from 20 to 38% by weight; |
| $Na_2O$ | <14% by weight; |
| $K_2O$ | <12% by weight; |
| $Na_2O + K_2O$ | $\geq$2% by weight; and |
| BaO | <0.9% by weight; | said cladding glass having a material composition, containing:

| | |
|---|---|
| $SiO_2$ | from 60-72% by weight; |
| $B_2O_3$ | <20% by weight; |
| $Al_2O_3$ | <10% by weight; |
| $Na_2O$ | <18% by weight; |
| $K_2O$ | <15% by weight; |
| $Li_2O$ | <5% by weight; and |
| F | $\leq$1% by weight; | said plastic sheath produced from a material having at least one of a negligibly low inherent evaporation of plastic additives and a residual monomer formation;
said plastic sheath being a polymer material, having an elongation at break of greater than 10%, which has a strength of shore 60A to shore 80D;
said plastic sheath containing a material formed of at least one of:
fluoropolymers;
thermoplastic elastomers based on at least one of olefins, crosslinked olefins and rubbers;
thermoplastics; and at least one of copolyesters, urethanes, polyesters, polyamides and polyetheramides; and said plastic sheath is one of a thermoplastic polyurethane elastomer and a crosslinked thermoplastic elastomer.

53. The fiber-optic cable according to claim 52, wherein said optical fiber bundle in said plastic sheath is wetted with a hydrophobic sizing agent.

54. The fiber-optic cable according to claim 52, wherein said sizing agent has at least one of:
carboxylic acids containing n carbon atoms ($C_n$; n>12);
ethoxylated fatty acid amino amides;
modified organosilanes;
fluoroalkyl-functional silanes;
perfluoropolyethers;
condensates of polyethylenimines and salts thereof; and
silicone oil.

55. The fiber-optic cable according to claim 52, wherein:
said bundle of individual fibers is at least one of hot melt bonded and adhesively bonded at ends and provided with crimped end terminations;
said individual fibers have end faces with an optically active region having a diameter of 0.3 to 2.0 mm;
said individual fibers have a diameter of 30 to 150 µm; and
the fiber-optic cable has an overall cable diameter of between 1 and 5 mm.

56. The fiber-optic cable according to claim 52, wherein:
said fluoropolymers are selected from the group consisting of PVDF, FEP, and ETFE; and
said thermoplastics are selected from the group consisting of PVC, PE, PP, PA, and PBT.

57. The fiber-optic cable according to claim 52, wherein said thermoplastic polyurethane elastomer and said crosslinked thermoplastic elastomer are selected from the group consisting of a polyvinylidene fluoride (PVDF), a thermoplastic urethane (TPE-U), a polypropylene copolymer (TPE-0) and a polyolefin rubber compound (TPE-V).

58. The fiber-optic cable according to claim 55, wherein said diameter is 1.0 mm.

59. The fiber-optic cable according to claim 55, wherein said diameter is 53 µm with a deviation tolerance of 4 µm.

60. The fiber-optic cable according to claim 55, wherein said overall cable diameter is 2.3 mm.

61. A method of using a fiber-optic cable, comprising the steps of:
providing the fiber-optic cable for illuminating applications in one of building technology, industrial technology, a power station, medical technology, a vehicle, shipping technology, an aircraft and space technology; or
providing the fiber-optic cable for data transmission in one of a building, an industrial plant, a power station, a medical installation, a vehicle, a ship, an aircraft, an automobile, a motorcycle and in space technology; and
the fiber-optic cable being a fiber-optic cable in accordance with claim 43.

* * * * *